United States Patent [19]
Smith

[11] Patent Number: 5,454,051
[45] Date of Patent: Sep. 26, 1995

[54] METHOD OF REDUCING BLOCK ARTIFACTS CREATED BY BLOCK TRANSFORM COMPRESSION ALGORITHMS

[75] Inventor: Craig M. Smith, Rochester, N.Y.

[73] Assignee: Eastman Kodak Company, Rochester, N.Y.

[21] Appl. No.: 740,241

[22] Filed: Aug. 5, 1991

[51] Int. Cl.⁶ ................................................. G06K 9/00
[52] U.S. Cl. .................................... 382/233; 382/268
[58] Field of Search ...................... 382/56, 41, 54, 382/27, 57, 43; 358/133, 430, 433; 364/725, 726, 826, 827; 348/241, 420, 607

[56] References Cited

U.S. PATENT DOCUMENTS

| | | | |
|---|---|---|---|
| 4,163,258 | 7/1979 | Ebihara et al. | 358/167 |
| 4,189,748 | 2/1980 | Reis | 358/133 |
| 4,581,638 | 4/1986 | Chiariglione et al. | 358/135 |
| 4,598,372 | 7/1986 | McRoberts | 364/518 |
| 4,707,738 | 11/1987 | Ferre et al. | 358/135 |
| 4,717,962 | 1/1988 | Moore | 358/433 |
| 4,754,492 | 6/1988 | Malvac | 382/41 |
| 4,783,839 | 11/1988 | Bamber | 382/54 |
| 4,805,030 | 2/1989 | Tanaka | 358/260 |
| 4,833,543 | 5/1989 | Verbiest | 358/260 |
| 4,894,713 | 1/1990 | Delogne et al. | 358/133 |
| 4,920,414 | 4/1990 | Remus | 358/133 |
| 4,941,043 | 7/1990 | Jass | 358/133 |
| 5,023,919 | 7/1991 | Wataya | 382/54 |
| 5,128,757 | 7/1992 | Citta et al. | 358/133 |
| 5,150,432 | 9/1992 | Ueno et al. | 382/56 |

FOREIGN PATENT DOCUMENTS

| | | | |
|---|---|---|---|
| 3155280 | 7/1991 | Japan | H04N 1/41 |
| 3167962 | 7/1991 | Japan | H04N 1/41 |
| 4002275 | 1/1992 | Japan | H04N 1/41 |

OTHER PUBLICATIONS

Nachrichten Technik Elektronik, vol. 38, No. 5, May, 1988, Berlin DD, pp. 166–169, L. Arnold et al. "Adaptive Transformationscodierung Von Grauwertbildern Mit Vermindetem Blocking-Effekt", Section 3.2 on pp. 168–169, FIG. 10.

*Primary Examiner*—Leo H. Boudreau
*Attorney, Agent, or Firm*—Edward Dugas

[57] ABSTRACT

A method of improving image quality when using block transform image compression algorithms by applying a variable lowpass filter (blur) operation on block boundaries that is based on the coefficients of the transformed data. The method of reducing block artifacts results from adaptively blurring the block boundaries based on the frequency content of the blocks. Low frequency blocks are heavily blurred, while high frequency blocks should have very little blur.

21 Claims, 7 Drawing Sheets

METHOD OF REDUCING BLOCK ARTIFACTS CREATED BY BLOCK TRANSFORM COMPRESSION ALGORITHMS

TECHNICAL FIELD

This invention relates generally to a method of processing digital images, and in particular, to a method of correcting block artifacts in images caused by transform-based image compression.

BACKGROUND ART

Digital images are composed of an enormous amount of data. Storage of this type of data on digital media is generally expensive and transmission of digital images requires either a large bandwidth or a long period of time. Many algorithms have been developed to compress image data by removing redundant information from the image. The goal of these algorithms is to reduce the amount of data needed to represent the image while minimizing the amount of image degradation.

One well known compression technique is transform coding. This method involves taking a transformation of the image data to provide a sequence of coefficients which can be encoded using, for example, a non-equal number of bits for each resulting coefficient. In particular, the number of bits employed is based upon the logarithm of the variance for a particular coefficient. At the receiver, the coded coefficient data is employed for reconstructing the coefficient values and performing the inverse of the original transform to obtain an image representative of the original data.

One form of transform coding, block image coding is often used to accommodate localized variations in image characteristics. With block image coding, a digitized image is decomposed into small rectangular regions (or "blocks") which are transform coded and, for example, transmitted through a digital communications channel. At the receiver, the blocks are decoded and re-assembled in order to reconstruct the image. In a typical situation, an image composed of an array of 512×512 picture elements (pixels) can be viewed as an array of 64×64 blocks, where each block contains 8×8 pixels.

Several kinds of transformations are commonly used for this type of coding. Typical transforms include the Fourier transform, cosine transform, Hadamard transform, and Harr transform. These transformations operate on an M×N block of image data and produce a M×N array of coefficients. These coefficients have the property that they are related to specific spatial frequencies in the original image. Normally, the two dimensional array of coefficients is arranged into a one dimensional array that approximately orders the coefficients from lowest frequency to highest frequency. This one dimensional array is then encoded and transmitted.

Of the possible transformations, the Discrete Cosine Transform (DCT) is the most commonly used. It has been proposed as a standard for lossy multibit image compression by the Joint Photographic Experts Group (JPEG) of the International Standards Organization (ISO). The DCT is popular because it tends to concentrate most of the information in the original image into a smaller group of low-frequency coefficients in the transformed image. These coefficients can then be efficiently encoded to provide the required compression.

The major disadvantage of block image coding is that the image is degraded by the coding process, and the boundaries of the reconstructed blocks can be clearly visible in the resulting image. In particular, this occurs because the quantization noise is generally correlated within blocks but is independent between blocks, yielding mismatches at block boundaries. Because of these blocking artifacts, reconstructed images appear to be composed of "tiles".

Several techniques have been described in the prior art for reducing the block artifacts. Most of these techniques involve modifying the encoder in some way so that when the image is decoded and reconstructed, there are no artifacts. One approach is to overlap the blocks slightly, by one pixel for example, and reconstruct the overlapping regions at the receiver by using the average of the reconstructed pixels from each of the overlapping blocks.

Another approach is described in U.S. Pat. No. 4,754,492. In this technique, the image data in a block is prefiltered with image data in the neighboring blocks, then transformed and encoded. Decompression consists of performing the inverse transform and postfiltering the blocks.

These techniques are useful if the source and destination of the images are both capable of performing the appropriate algorithms. However, in many applications, a user who receives compressed images does not have control over the particular technique used to encode the image. For example, the DCT compression algorithm proposed as a standard by the JPEG committee does not employ any special encoding techniques to remove block artifacts from the decoded images. In this case, some other method must be used to remove the block artifacts.

Another common technique is to use a low-pass filter to blur the block boundaries in the image. This technique has the advantage of not requiring special processing during the compression of the image. Although this technique is very effective in reducing the blocking effects, it blurs high frequency details along the block boundaries with a perceptible loss of sharpness. Another way of looking at that problem is by examining the RMS error in the image. In low-frequency areas, blurring the image tends to reduce the RMS error in the image; however, in high frequency areas, where consecutive pixels have less correlation, blurring the image substantially raises the RMS error.

The object of the present invention is to provide an improved method for removing block artifacts from images that have been compressed by a block transform compression algorithm. It is a further object of this invention to provide the block artifact removal as part of the decoding process only.

DISCLOSURE OF THE INVENTION

This invention is a method of adaptively processing the boundaries of an image to reduce the block artifacts in the image without blurring high frequency detail within the image. The invention operates as a part of the compression decoder only.

A block transform decoder includes a means of decoding the transform coefficients from the compressed image data. These coefficients are then inverse transformed to reconstruct an image block that is representative of the original data. In this invention, the decoded transform coefficients are evaluated by a frequency analyzer. The frequency analyzer then decides on an appropriate amount of blur to be applied to the boundaries of adjacent blocks. This decision is sent to a variable strength lowpass filter that blurs the pixels along the boundary between the blocks.

This invention applies to transformations in which the transformed image is representative of the frequency content of the image. The Fourier transform, cosine transform, Hadamard transform, and Harr transform all fall into this category. Using this feature, the frequency analyzer can easily determine the amount of high frequency detail in the image by simply examining the position and magnitude of the coefficients in the transformed data.

MODES OF CARRYING OUT THE INVENTION

In the preferred embodiment, the invention applies to the DCT algorithm which has been adopted by the JPEG ISO committee. The present embodiment provides a method of correcting block artifacts of the DCT algorithm by adaptively blurring the block boundaries based on the frequency content of the blocks. Low frequency blocks are heavily blurred, while high frequency blocks receive very little blur.

Because the DCT transforms the image into the frequency domain one can adaptively blur the block boundaries based on the coefficients of the DCT; for example, the amount of blur on the frequency of the highest non-zero coefficient in the transformed blocks.

Figure 1:
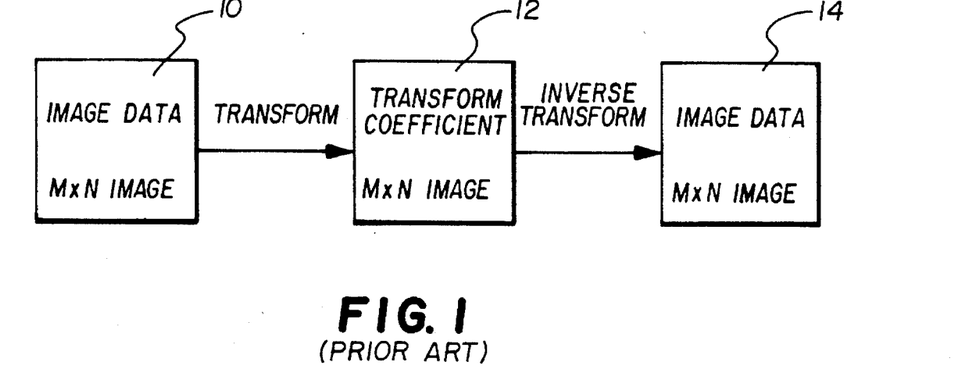
FIG. 1 illustrates the theoretical transform model known in the art using a functional block diagram.

FIG. 1 illustrates the well known method of how to apply a transform to image data. The original M×N image data in block 10 can be transformed using any of the previously described transform algorithms into an array of M×N coefficients in block 12. The newly transformed image has no resemblance to the original image, the inverse transform operation can then be applied to the transform coefficients and an image is reconstructed in block 14 that is representative of the original image. If the transform coefficients are stored with infinite precision, the newly reconstructed image would be an exact duplicate of the original image.

Figure 2:
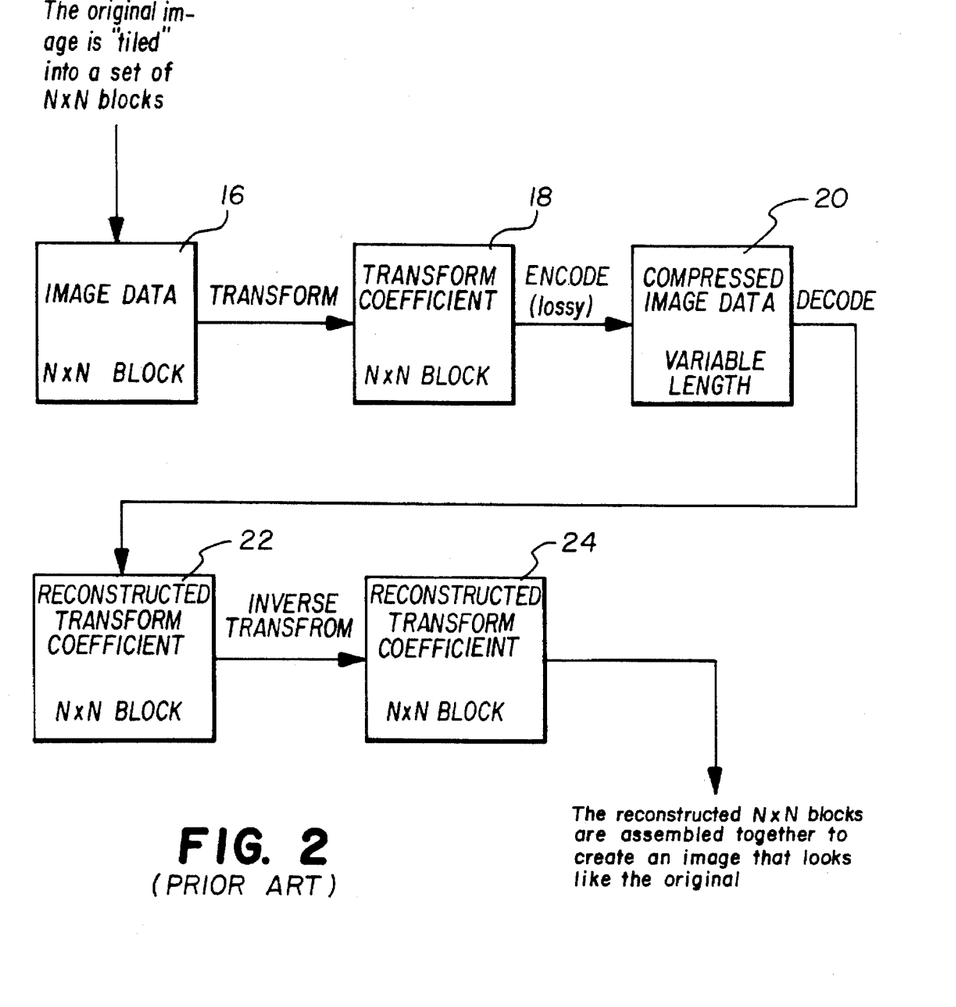
FIG. 2 illustrates the use of transforms in block image compression as was commonly known in the art using a functional block diagram.

FIG. 2 illustrates a functional block diagram that demonstrates how transforms are commonly used in image compression. First the image data is tiled into a set of N×N blocks in block 16 to reduce the computational demands of the transformation. Each block is then transformed in block 18, and the transform coefficients are encoded with some loss of precision into the compressed image data in block 20. The compressed data may then be stored or transmitted. To reconstruct the image, the compressed data is decoded to N×N blocks of transform coefficients in block 22, and inverse transform is applied thereto. The reconstructed image blocks in block 24 are then reassembled into a new image that is representative of the original image.

Figure 3:
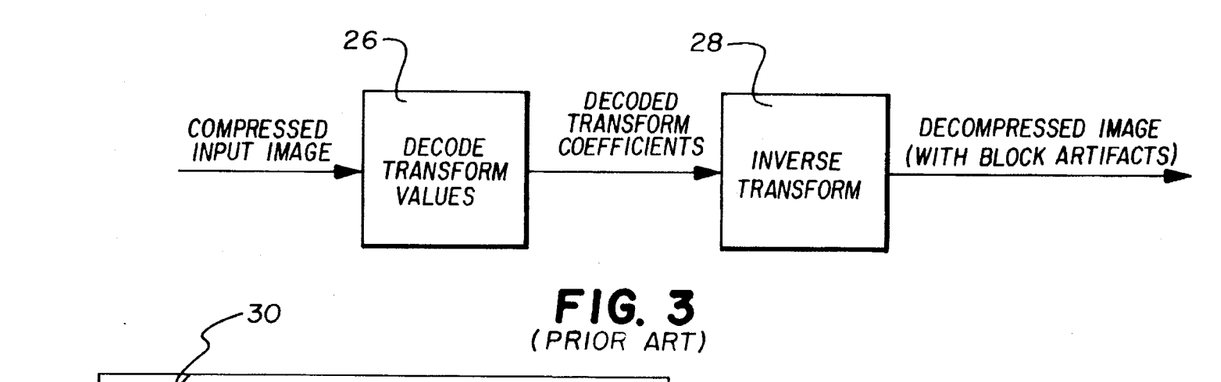
FIG. 3 illustrates a generalized block transform decompression known in the art using a functional block diagram.

FIG. 3 shows a typical prior art block transform decoder. The decoder 26 reads the compressed input image data and creates a block of decoded transform coefficients. The inverse transform 28 takes the coefficients outputted by decoder 26 and performs the inverse transform operation to create a reconstructed block of the image.

Figure 4:
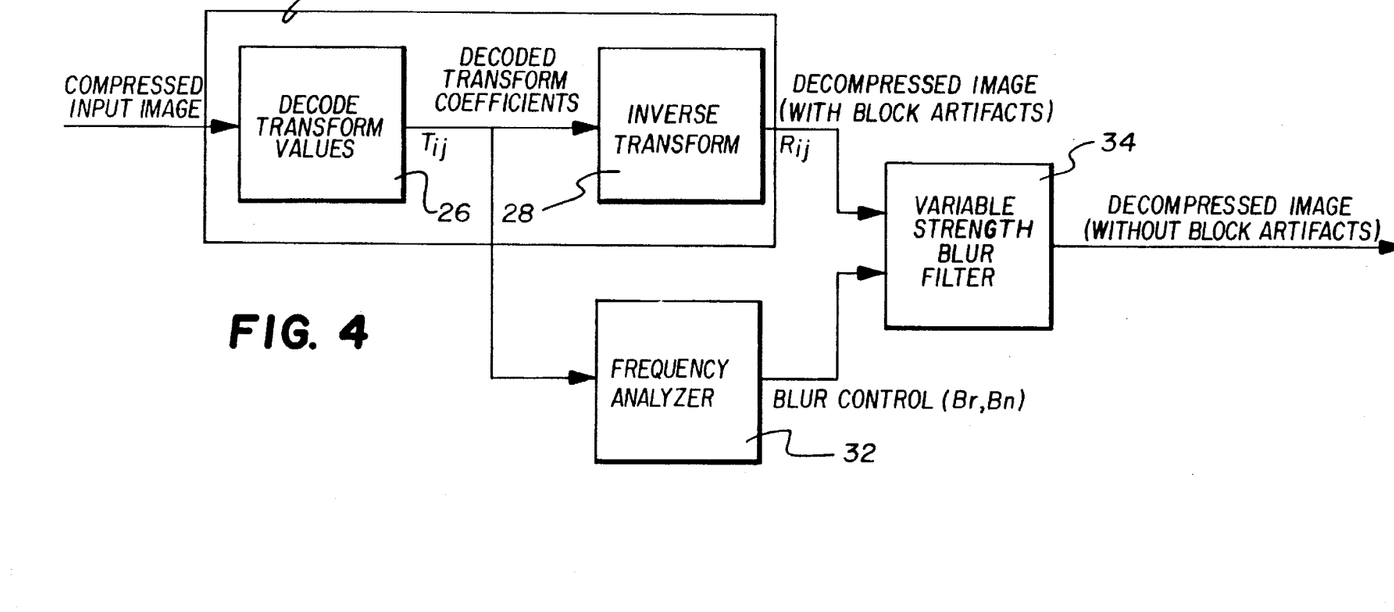
FIG. 4 illustrates in a functional block diagram of the preferred embodiment of this invention.

The preferred embodiment of the present invention is shown in FIG. 4. The system shown in FIG. 3 is in box 30 and has added thereto a frequency analyzer 32 and a filter 34. Compressed image data enters decoder 26 which generates a block of decoded transform coefficients, $T_{ij}$ (for the block in the ith column and the jth row of the tiled image). These coefficients are then sent to inverse transform 28 and frequency analyzer 32. Inverse transform 28 transforms the decoded coefficients into a block of reconstructed image data, $R_{ij}$ representative of the original image but with the block artifacts. The image data from decoder 26 is also passed to frequency analyzer 32 which analyzes the magnitude of the coefficients in block $T_{ij}$ so as to determine the amount of blur required to remove the block artifacts between adjacent blocks. A vertical blur factor $B_v$, is generated to control the amount of blur applied to the vertical boundary between the current reconstructed image block, $R_{ij}$ and the previous block on the current line, $R_{i-1\ j}$. A horizontal blur factor is generated to control the amount of blur applied to the horizontal boundary between the current reconstructed image block, $R_{ij}$, and the adjacent block on the previous line, $R_{i\ j-1}$. These decisions are sent to filter 34. Filter 34 blurs the pixels along the block boundaries with adjacent pixels from neighboring blocks to generate a new image representation of the original but without block artifacts.

Figure 5:
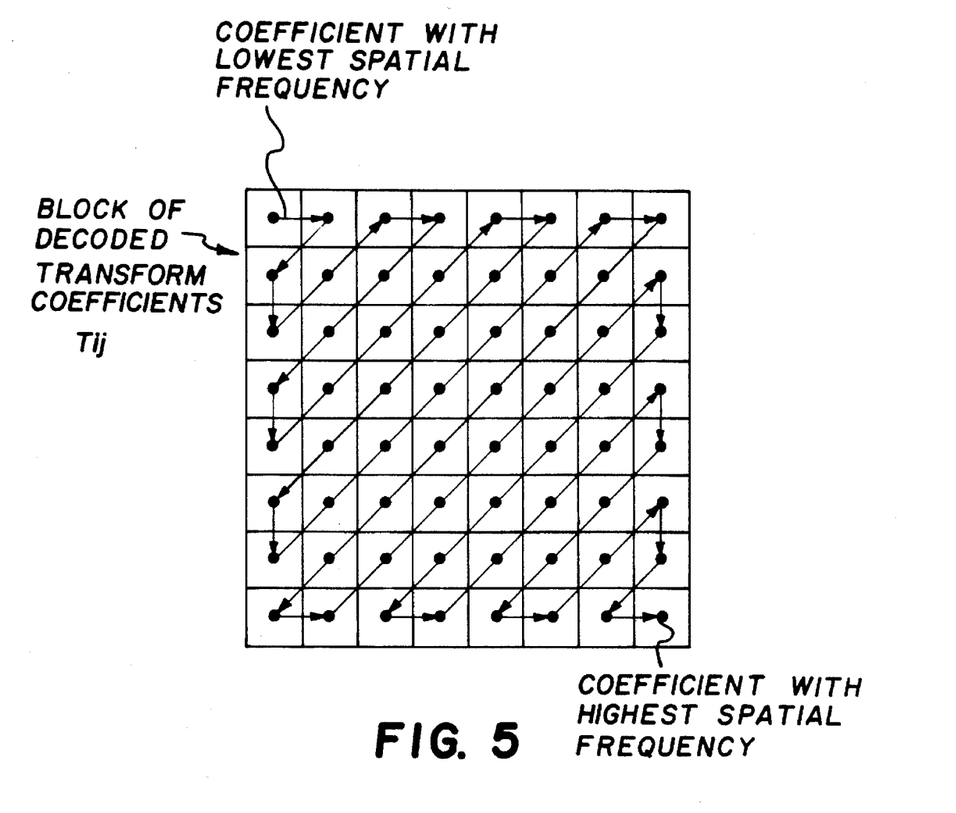
FIG. 5 illustrates a method of arranging 2-dimensional transform coefficients into a 1-dimensional list.

The technique of ordering the coefficients in a zigzag pattern shown in FIG. 5 is well known. Use of this technique corresponds roughly to ordering the coefficients in order from those representing the lowest spatial frequencies to those representing the highest spatial frequencies. This pattern is used because it groups similar frequencies together to allow for more efficient encoding of the data.

In accordance with our preferred embodiment, the amount of blur along block boundaries is based on the highest non-zero coefficient in the adjacent blocks. The 8×8 array of transformed values are placed in a 1-dimensional list in approximately increasing frequency. FIG. 5 illustrates how the 8×8 array of coefficients are transformed into a 1-dimensional list in approximately increasing frequency. Because the value of the highest non-zero coefficient or cutoff frequency in this list is known as a result of the decoding procedure, this value may be stored for later use in the frequency analyzer (32).

The function of the frequency analyzer 32 is to examine the one dimensional list for each block and determine the appropriate amount of blur to apply to the block boundaries. In the preferred embodiment shown in FIG. 6, the activity level $A_{ij}$, is determined by the activity analyzer 36. The activity level corresponds to the position of the last coefficient in the list whose value is above a predetermined threshold. The activity level $A_{ij}$, is selected in this way for efficiency. The activity level is then stored in storage block 38 while the activity levels for the two adjacent block, $A_{i-1\ j}$ and $A_{i\ j-1}$ are retrieved from storage. These three values are passed to the blur selection block 40 to determine the required amount of blur, $B_v$ and $B_h$, to apply to the horizontal and vertical boundaries between the current reconstructed image block $R_{ij}$, and the previous adjacent reconstructed image blocks.

Figure 6:
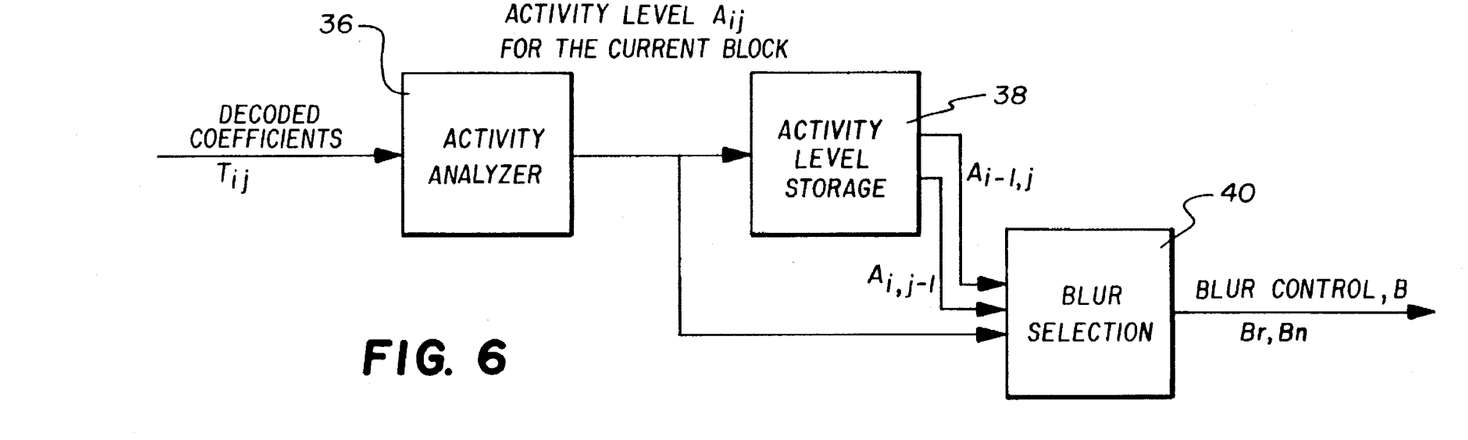
FIG. 6 illustrates in a functional block diagram the configuration of the frequency analyzer shown in FIG. 4.

The threshold is normally set to zero which results in a very efficient implementation. The decoder block 26 identifies the location of the last non-zero coefficient in the encoded list because the standard JPEG algorithm requires that an End-of-Block code be transmitted after the last non-zero coefficient.

In the preferred embodiment, the two blur factors, $B_v$ and $B_h$, are determined within the blur selection block 40 by using the activity levels from the two adjacent blocks ($A_{ij}$ and $A_{i-1\ j}$ for $B_v$ and $A_{ij}$ and $A_{i\ j-1}$ for $B_h$) as indices into a two-dimensional table of blur values. The blur values in the table are experimentally determined to minimize the RMS error in the pixel along the boundaries. As a result, the block artifacts are removed while reducing the RMS error in the reconstructed image.

Figure 7:
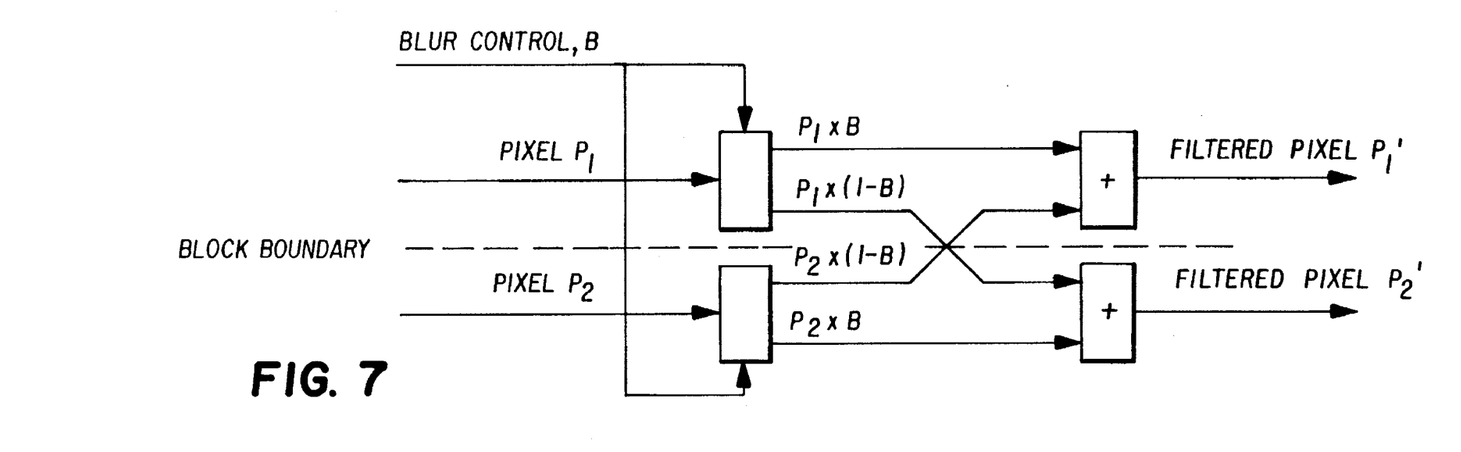
FIG. 7 illustrates a functional block diagram of the configuration of the blur filter shown in FIG. 4.
Figure 8:
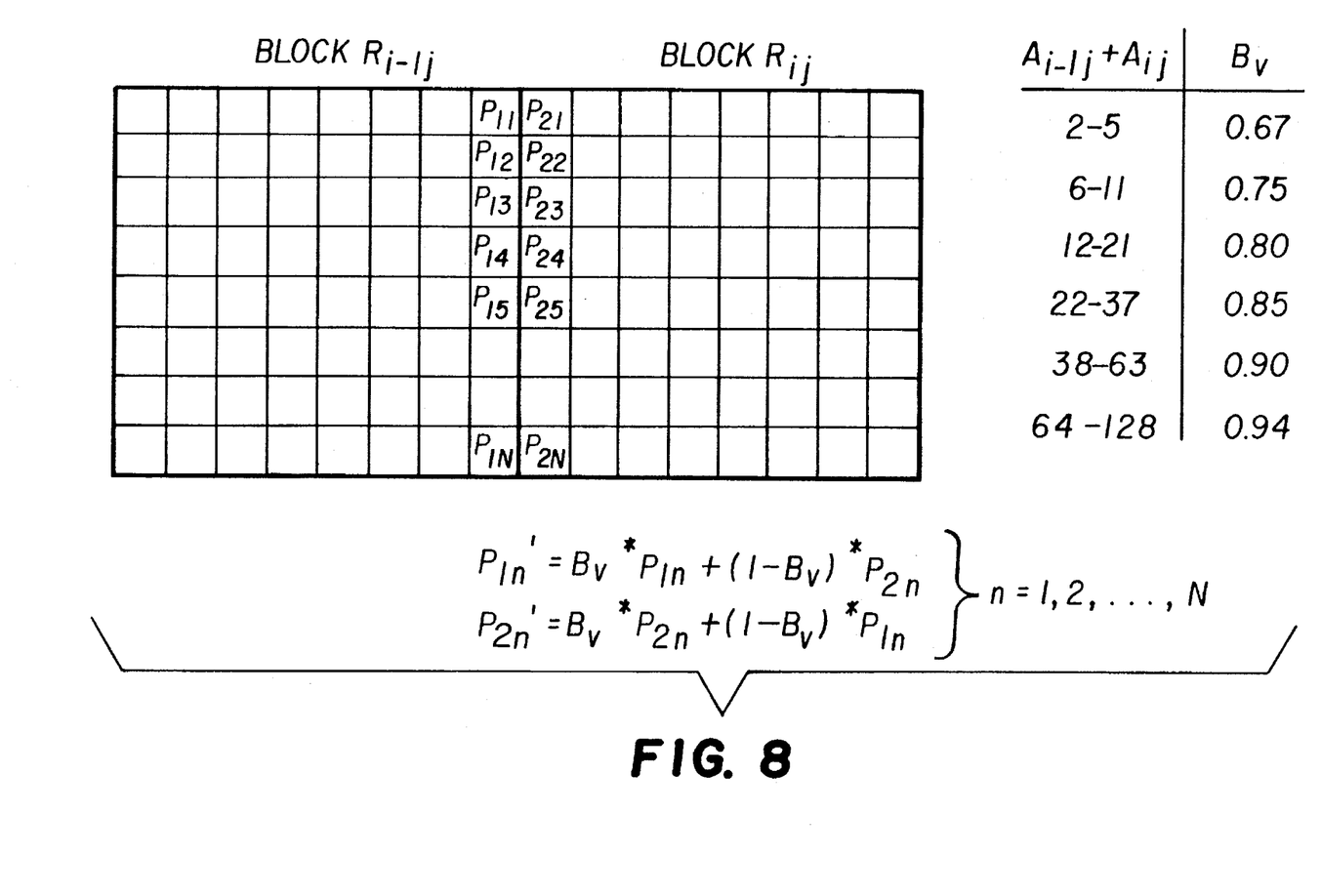
FIG. 8 shows the locations of the pixels that form a vertical boundary between two horizontally adjacent blocks.

The blur values are numbers between zero and one that are used by blur filter 34. For each pixel along the boundary the filter uses the original value of the pixel $P_1$, and the value of the adjacent pixel in the neighboring block $P_2$, to determine a new value $P_1'$ that replaces the original value, $P_1'$ is calculated by the following equation:

$$P_1' = (P_1 \times B) + (P_2 \times (1-B))$$

FIG. 7 shows the filter design that executes the steps set forth by the above equation. This filter design provides good artifact removal and can be implemented efficiently. Larger, more complex filters could be used to provide more thorough artifact removal resulting in unfortunately, larger execution time.

Flow Chart

Figure 9A:
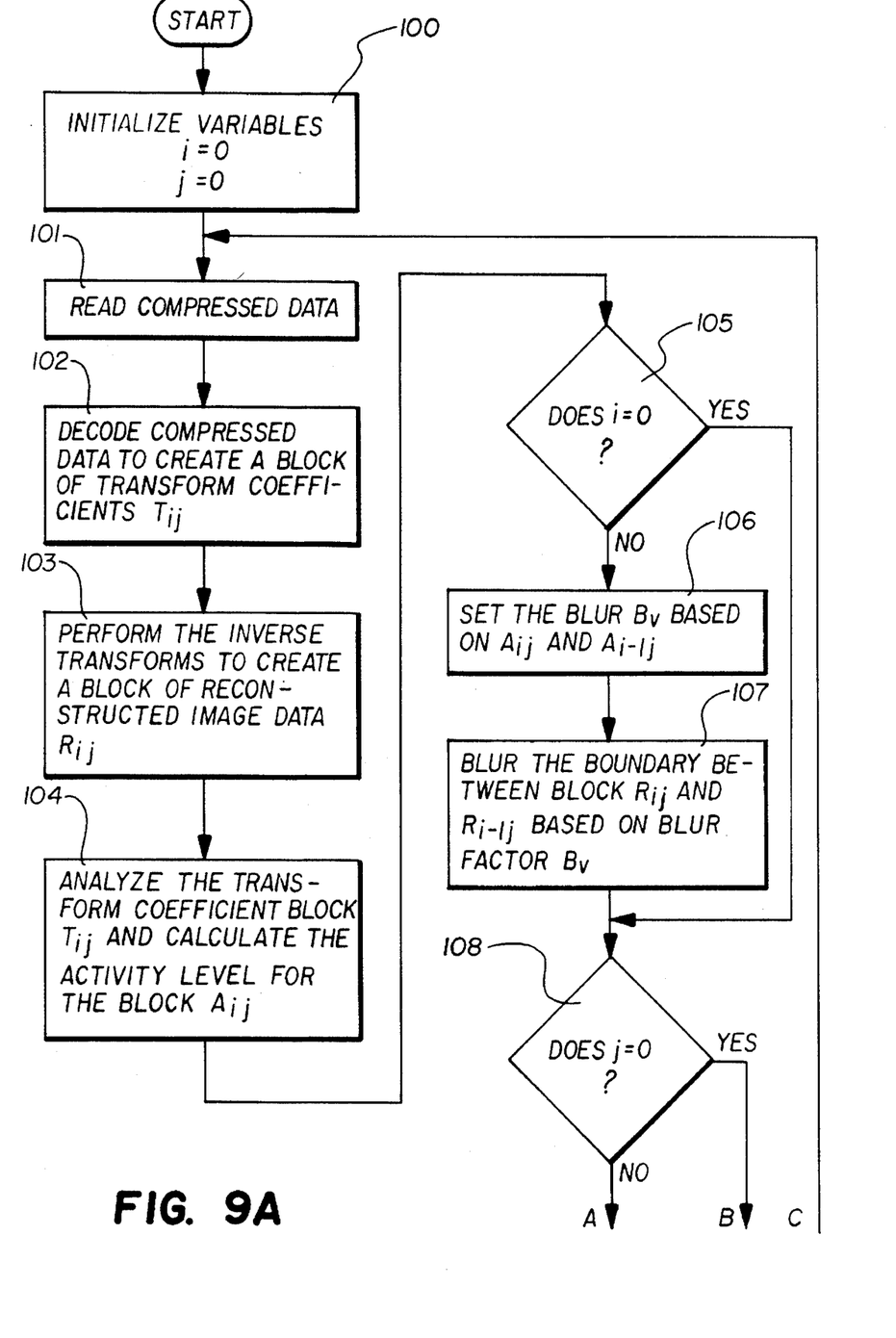
FIGS. 9A–B illustrate a flow chart of the preferred embodiment of the present invention.
Figure 9B:
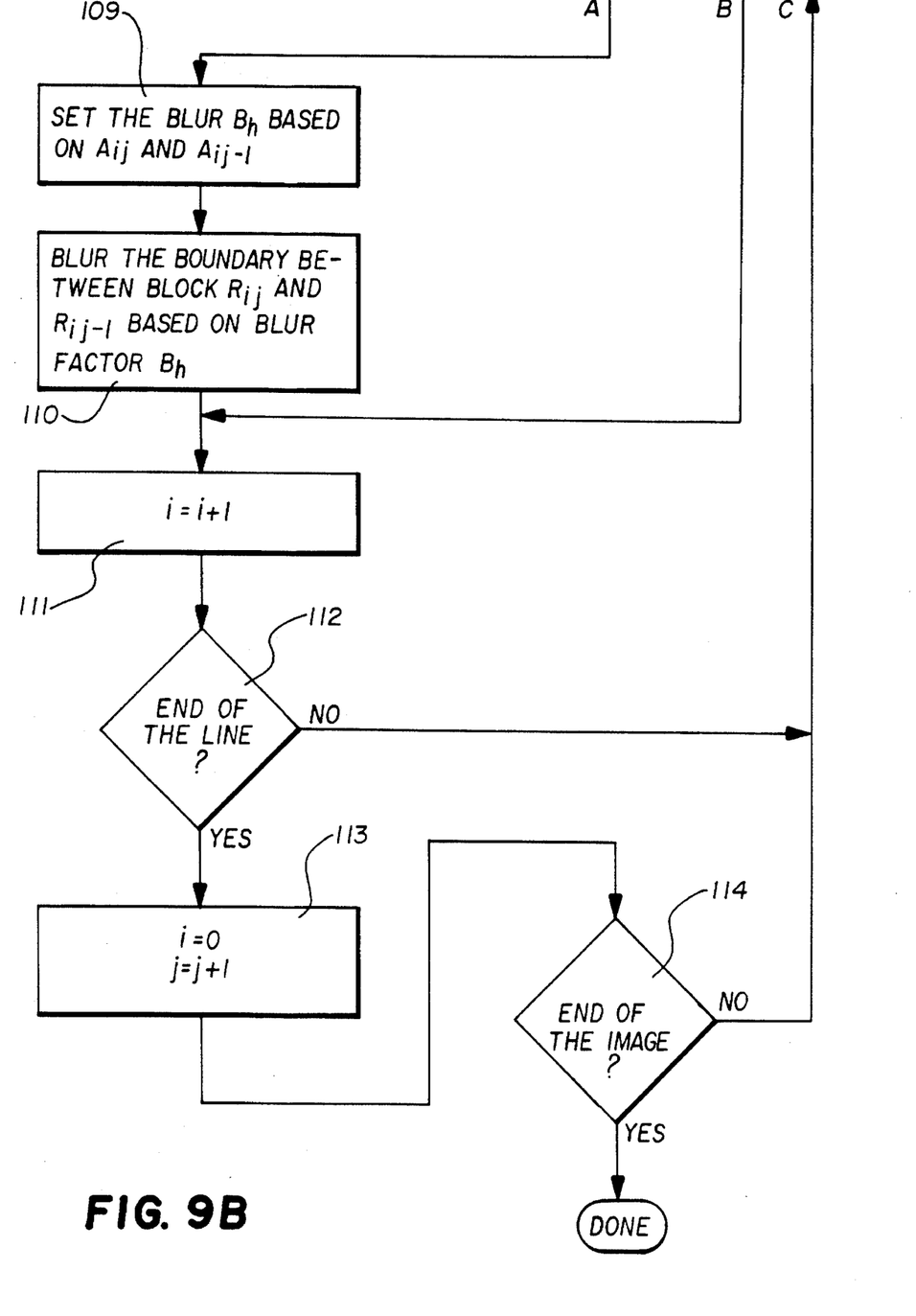

FIGS. 9A–B shows a flow chart for the invention. Block 100 initializes variables i and j to keep track of the row and column of the image block being decoded. Block 101 reads enough compressed data to decode the transform coefficients for the current image block. Block 102 decodes the compressed data to create an N×N block of transform coefficients, $T_{ij}$. Block 103 performs the inverse transform on $T_{ij}$ to create an N×N block of reconstructed image data $R_{ij}$. Block 104 analyzes the block of transform coefficients $T_{ij}$, and assigns an activity level $A_{ij}$ to the image block. Decision block 105 checks to see if the current image block is the first block on the line to determine if there is a vertical boundary with the previous reconstructed image block $R_{i-1\ j}$. Block 106 selects the amount of blur $B_v$, that should be applied to the vertical boundary between the current block and the previous block based on the activity levels in the blocks $A_{ij}$ and $A_{i-1\ j}$. Block 107 performs the blur on the vertical block boundary. Decision block 108 checks to see if the current block is in the first line of the image to determine if there is a block above that forms a horizontal boundary with the current image block. Block 109 selects the amount of blur $B_h$, that should be applied to the horizontal boundary between the current block $R_{ij}$, and the corresponding block on the previous line $R_{i\ j-1}$, based on the activity levels in the blocks, $A_{ij}$ and $A_{i\ j-1}$, block 110 performs the blur operation on the horizontal boundary. Block 111 increments the column counter, i, and decision block 112 tests to see if the end of the current image line has been reached. If not, the next block on the line is processed in the same manner. When the end of the image line is reached, the column counter is reset to 0 and the line counter is incremented in block 113. Decision block 114 checks to see if the end of the image has been reached. If not, the next line is processed in the same manner, otherwise the process is finished.

It should be understood that more complicated algorithms can be used for the frequency analyzer, for example, by also examining the amplitude of the low frequency coefficients or alternatively, one could examine the highest horizontal and vertical frequencies and process horizontal and vertical borders differently.

Advantages and Industrial Applicability

An important advantage of the present invention is that the image quality of the images that have been processed by JPEG DCT is improved without modifying the compression algorithm that is being considered as a standard. It should be understood that while the filtering concept of the present invention has been described in terms of the JPEG DCT standard, it is equally applicable to any DCT based compression algorithm, and more generally to any frequency transform based algorithm.

Another way of practicing the present invention is to modify the software implementation of the DCT algorithm to provide the filtering operation of the present invention. The filter operation is very fast and does not degrade the image in high frequency areas.

The present invention will find applicability in the transmission and storage of digitized images that have been processed using a compression algorithm that incorporates a frequency transform.

What is claimed is:

1. A method for decoding compressed image data using block transformed images wherein block boundaries are adaptively processed to reduce block artifacts in it reconstructed image, comprising the steps of:

decoding the compressed image data to create transform coefficients;

applying an inverse transform to the transform coefficients obtained from the compressed image data;

frequency analyzing the transform coefficients to determine a frequency content of the transformed image along boundaries between blocks;

adjusting a strength of a low pass blur filter in response to the analyzed frequency content of the transformed image along the block boundaries; and processing the transform coefficients with said filter to reduce block artifacts along the boundaries between blocks.

2. The method set forth in claim 1 wherein the transform is a Discrete Cosine function.

3. The method set forth in claim 1 wherein the transform takes the form of a Fourier transform.

4. The method set forth in claim 1 wherein the transform takes the form of a Hadamard transform.

5. The method set forth in claim 1 wherein the transform takes the form of a Harr transform.

6. A method for decoding compressed image data using block transforms that subdivide an image into blocks of pixels, comprising the steps of:

decoding the compressed image data to create a block of transform coefficients;

applying a bidirectional transformation to the block of transform coefficients;

transmitting the transform coefficients for blur control;

adjusting an amount of blur in a low pass filter along adjacent block boundaries in response to the transform coefficients; and processing the transmitted transform coefficients with said filter to reduce block artifacts along the boundary between blocks.

7. A method for decoding compressed image data using block transforms that subdivide each image into blocks of pixels, comprising the steps of:

reading the compressed image data;

decoding the compressed image data to create a block of transform coefficients;

applying an inverse transform to said block of transform coefficients to provide a block of reconstructed image data;

analyzing the block of transform coefficients to determine a level of activity in said block of transform coefficients;

adjusting blur in a variable strength blur filter based upon said activity; and processing the blocks of reconstructed image data with said filter to reduce block artifacts along a boundary between blocks.

8. The method set forth in claim 7 wherein the transform is a Discrete Cosine function.

9. The method set forth in claim 7 wherein the transform takes the form of a Fourier transform.

10. The method set forth in claim 7 wherein the transform takes the form of a Hadamard transform.

11. The method set forth in claim 7 wherein the transform takes the form of a Harr transform.

12. An apparatus for decoding compressed image data using a block transformation that subdivides each image into blocks of pixels, comprising:

means for decoding the compressed image data to provide decoded transform coefficients;

a low pass blur filter;

means for applying an inverse transform to the transfer coefficients to provide a decompressed image signal to said low pass blur filter;

means for analyzing a frequency of the decoded transform coefficients; and means for adjusting an amount of blur in said low pass blur filter in accordance with the analyzed frequency content of the decoded transform coefficients reducing block artifacts along adjacent block boundaries.

13. The apparatus set forth in claim 12 wherein the transform is a Discrete Cosine.

14. The apparatus set forth in claim 12 wherein the transform takes the form of a Fourier transform.

15. The apparatus set forth in claim 12 wherein the transform takes the form of a Hadamard transform.

16. The apparatus set forth in claim 12 wherein the transform takes the form of a Harr transform.

17. An apparatus for decoding compressed image data using a block transformation that subdivides each image into blocks of pixels, comprising:

means for reading the compressed image data;

means for decoding the compressed image data from said means for reading to create blocks of transform coefficients;

means for applying an inverse transform to the blocks of transform coefficients resulting in blocks of reconstructed image data;

means for analyzing the blocks of transform coefficients to determine an activity level in the blocks of transform coefficients;

a variable strength blur filter receiving said to receive the blocks of reconstructed image data; and means for setting a blur level of said variable strength blur filter based upon the activity level of the blocks of transform coefficients reducing block artifacts along a boundary between the blocks of pixels.

18. The apparatus set forth in claim 17 wherein the transform is a Discrete Cosine.

19. The apparatus set forth in claim 17 wherein the transform takes the form of a Fourier transform.

20. The apparatus set forth in claim 17 wherein the transform takes the form of a Hadamard transform.

21. The apparatus set forth in claim 17 wherein the transform takes the form of a Harr transform.

* * * * *